(12) United States Patent
Mohanraj et al.

(10) Patent No.: US 9,848,048 B2
(45) Date of Patent: Dec. 19, 2017

(54) METHOD AND APPARATUS FOR TRANSMITTING AN IDENTITY

(75) Inventors: John-N Mohanraj, Bangalore (IN); Elangovan Manickam, Bangalore (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 308 days.

(21) Appl. No.: 13/976,165

(22) PCT Filed: Dec. 29, 2010

(86) PCT No.: PCT/EP2010/070833
§ 371 (c)(1),
(2), (4) Date: Aug. 20, 2013

(87) PCT Pub. No.: WO2012/089247
PCT Pub. Date: Jul. 5, 2012

(65) Prior Publication Data
US 2013/0339531 A1    Dec. 19, 2013

(51) Int. Cl.
*H04L 12/24* (2006.01)
*H04L 29/08* (2006.01)
*H04M 3/42* (2006.01)
*H04L 29/06* (2006.01)

(52) U.S. Cl.
CPC ........ *H04L 67/141* (2013.01); *H04L 65/1069* (2013.01); *H04M 3/42042* (2013.01); *H04M 3/42068* (2013.01); *H04M 3/42153* (2013.01); *H04M 2207/185* (2013.01)

(58) Field of Classification Search
CPC .............. H04L 67/141; H04L 65/1069; H04M 2207/185; H04M 3/42042; H04M 3/42153; H04M 3/42068

USPC ................................................... 709/227, 379
See application file for complete search history.

(56) References Cited

U.S. PATENT DOCUMENTS

| | | | |
|---|---|---|---|
| 7,787,878 B2* | 8/2010 | Li | H04M 15/57 370/352 |
| 7,995,727 B1* | 8/2011 | Chmara | H04M 1/57 370/352 |
| 2007/0280447 A1* | 12/2007 | Cai et al. | 379/114.03 |
| 2007/0283022 A1* | 12/2007 | Rajko | H04W 60/00 709/227 |
| 2008/0137829 A1* | 6/2008 | Kaal et al. | 379/142.01 |
| 2009/0075636 A1* | 3/2009 | Akam | H04W 4/20 455/415 |
| 2009/0175426 A1* | 7/2009 | Beyer et al. | 379/93.02 |

(Continued)

OTHER PUBLICATIONS

IPCablecom2 architecture framework; J.360 (Nov. 2006), "Series J: Cable Networks and Transmission of Television, Sound Programme and Other Multimedia Signals", 1-126.

(Continued)

*Primary Examiner* — Ario Etienne
*Assistant Examiner* — Elizabeth Kassa
(74) *Attorney, Agent, or Firm* — Squire Patton Boggs (US) LLP

(57) ABSTRACT

The invention relates to a session control entity, method and computer program for receiving a first identity of a calling user from a subscription entity, wherein the first identity is an identity for displaying to a called user, receiving a request from the calling user, including the first identity in the request as an identity for displaying to the called user, and, transmitting the request towards the called user.

26 Claims, 5 Drawing Sheets

(56) References Cited

U.S. PATENT DOCUMENTS

| | | | |
|---|---|---|---|
| 2009/0310765 A1* | 12/2009 | Denny | H04M 3/42042 379/142.15 |
| 2011/0028130 A1* | 2/2011 | Swaminathan | H04M 3/42195 455/414.1 |
| 2011/0213896 A1* | 9/2011 | Merino Vazquez | H04L 29/12188 709/245 |
| 2012/0083248 A1* | 4/2012 | Van Wyk et al. | 455/412.2 |
| 2012/0195417 A1* | 8/2012 | Hua | H04M 3/42042 379/142.04 |
| 2013/0065567 A1* | 3/2013 | Cui | H04M 7/006 455/415 |

OTHER PUBLICATIONS

IPCablecom2 architecture framework; J.360 (Jun. 2007), Amendment 1: New Appendix IV—Home Subscriber Server (HSS), "Series J: Cable Networks and Transmission of Television, Sound Programme and Other Multimedia Signals", 1-36.

International Search Report and Written Opinion dated Jun. 20, 2012 issued in corresponding International Application No. PCT/EP2010/070833.

* cited by examiner

METHOD AND APPARATUS FOR TRANSMITTING AN IDENTITY

TECHNICAL FIELD OF THE INVENTION

The present invention relates to a mechanism for transmitting an identity of a user. In particular, the present invention is related to a method and apparatus for transmitting an identity for displaying to a called user.

BACKGROUND OF THE INVENTION

Within the IP (Internet Protocol) Multimedia Subsystem (IMS) as defined by $3^{rd}$ Generation Partnership Project (3GPP) Session Initiation Protocol (SIP) defined by the Internet Engineering Task Force (IETF) is used for controlling communication. SIP is an application-layer control protocol for creating, modifying, and terminating sessions with one or more participants. These sessions may include Internet multimedia conferences, Internet telephone calls, and multimedia distribution. Members in a session can communicate via multicast or via a mesh of unicast relations, or a combination of these. Session Description Protocol (SDP) is a protocol which conveys information about media streams in multimedia sessions to allow the recipients of a session description to participate in the session. The SDP offers and answers can be carried in SIP messages. Diameter protocol has been defined by IETF and is intended to provide an Authentication, Authorization and Accounting (AAA) framework for applications such as network access or IP mobility.

Generally, for properly establishing and handling a communication connection between network elements such as a user equipment and another communication equipment or user equipment, a database, a server, etc., one or more intermediate network elements such as control network elements, support nodes, service nodes and interworking elements are involved which may belong to different communication networks.

Mechanisms exist to transfer subscriber related information between a proxy call state control function (P-CSCF), a serving CSCF (S-CSCF) and a home subscriber server (HSS). The subscriber related information includes so-called 'Display Name' parameter which represents a preferred name of a calling party. In addition to displaying the calling number, the display name can be presented to the called party However if the display name is updated at the HSS, the old display name is still displayed to called parties on all newly initiated calls until a registration/re-registration of the calling subscriber takes place and the subscriber related information at the P-CSCF is updated.

Subscriber related information is sent to a P-CSCF at the time of registration from a S-CSCF in a 200 OK SIP response. In case there is a change in the display name of the subscriber at the HSS in the interim, the change (new display name) is communicated from the HSS to the S-CSCF. However the updated information does not reach the P-CSCF until the time of a re-registration, which means that the data contained in the user profile for the subscriber is not consistent at the P-CSCF and the S-CSCF.

Until the next re-registration occurs, the older display name is used for all calls that are established by the subscriber. For example, if a re-registration timer is set to 24 hours, it can take up to 24 hours before the new display name is shown to called parties.

SUMMARY OF THE INVENTION

The present invention can overcome some of above drawbacks by providing an apparatus, a method and a computer program product comprising receiving a first identity of a calling user from a subscription entity, wherein the first identity comprises an identity for displaying to a called user, receiving a request from the calling user,
including the first identity in the request as an identity for displaying to the called user, and,
for transmitting the request towards the called user.

According to an aspect of the invention, the apparatus, method and computer program product can further comprise determining if the first identity is to be included in the request, and wherein the including comprises to include the first identity based on the result of the determining.

The receiving can comprise receiving a session initiating protocol request, and/or, receiving a second identity for displaying to a called user, and/or, receiving the second identity in a P-Asserted-Identity header, and/or, receiving the request from a proxy entity.

The determining can comprise comparing the first identity with the second identity, The including can comprise to include the first identity if the second identity differs from the first identity.

According to an aspect of the invention, the apparatus, method and computer program product can further comprise maintaining an indication associated with the first identity, wherein the indication indicates if the first identity has been changed after previous registration procedure of the calling user.

The determining can comprise checking the indication indicating if the first identity has been changed. The including can comprise to include the first identity if the first identity has been changed.

According to an aspect of the invention, the apparatus, method and computer program product can further comprise transmitting the first identity to a proxy entity during registration procedure of the calling user and changing the state of the indication indicating if the first identity has been changed in response to the transmitting the first identity to the proxy entity.

According to an aspect of the invention, the apparatus, method and computer program product can further comprise changing the state of the indication indicating if the first identity has been changed in response to receiving the first identity of the calling user from the subscription entity.

The identity for displaying to the called user can comprise a display name, and/or can be configurable by the calling user.

According to an aspect of the invention, the apparatus, method and computer program product can further comprise storing the first identity of the calling user.

Further, an apparatus, a method and a computer program product are provided, comprising receiving a first identity of a calling user from a subscription entity outside registration procedure of the calling user, wherein the first identity comprises an identity for displaying to a called user, and,
transmitting the first identity to a proxy entity responsive to the receiving.

The transmitting can comprise transmitting the first identity in a session initiation protocol NOTIFY message.

Embodiments of the present invention may have one or more of following advantages:
Up to date display name is shown to called users.

Inconsistency of display names between the P-CSCF and the S-CSCF/HSS is not visible to end users.

DETAILED DESCRIPTION OF THE INVENTION

Figure 1:
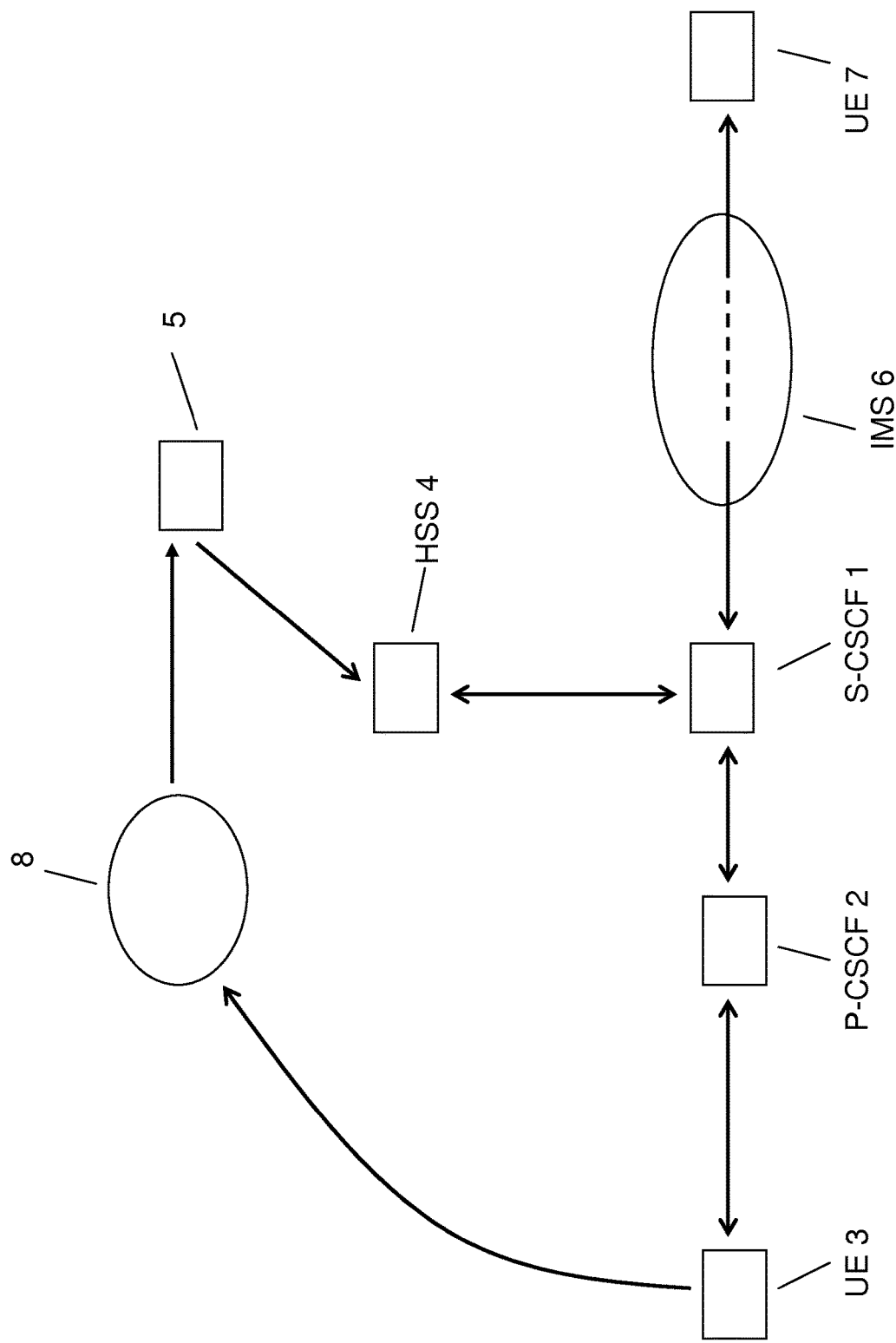
FIG. 1 illustrates network elements and interfaces between the network elements relevant for the invention.

Different types of network entities and functions exist in the IMS network. Call Session Control Functions (CSCF) implement a session control function in SIP layer. The CSCF can act as Proxy CSCF (P-CSCF), Serving CSCF (S-CSCF) or Interrogating CSCF (I-CSCF). The P-CSCF is the first contact point for the User Equipment (UE) within the IMS; the S-CSCF handles the session states in the network; the I-CSCF is mainly the contact point within an operator's network for all IMS connections destined to a subscriber of that network operator, or a roaming subscriber currently located within that network operator's service area.

The functions performed by the I-CSCF are, for example, assigning an S-CSCF to a user performing a SIP registration and routing SIP requests received from another network towards the S-CSCF. The S-CSCF can perform the session control services for the UE. It maintains a session state as needed by the network operator for support of the services and may be acting as Registrar, i.e. it accepts registration requests and makes its information available through the location server (e.g. HSS). The S-CSCF is the central point to users that are hosted by this S-CSCF. The S-CSCF can provide services to registered and unregistered users when it is assigned to these users. This assignment can be stored in the Home Subscriber Server (HSS).

The HSS is the master database for a given user. It is the entity containing the subscription-related information to support the network entities actually handling calls/sessions. As an example, the HSS provides support to the call control servers (CSCFs) in order to complete the routing/roaming procedures by solving authentication, authorisation, naming/addressing resolution, location dependencies, etc.

The HSS can be responsible for holding the following user related information:
  User identification, numbering and addressing information, including a display name.
  User security information: Network access control information for authentication and authorization, such as password information
  User Location information at inter-system level: the HSS supports the user registration, and stores inter-system location information, etc.
  User profile information.

Cx reference point or Cx interface is an interface between a CSCF and a HSS, supporting the transfer of data between them. The Cx reference point is based on the diameter protocol with 3GPP standard diameter applications. Sh interface is a corresponding interface between the HSS and an AS. Diameter is an authentication, authorisation, and accounting (AAA) protocol defined by the IETF and used for network access services, such as dial-up and mobile IP.

The Diameter base protocol is evolved from the remote authentication dial-in user service (RADIUS) protocol.

Diameter multimedia client and Diameter multimedia server implement the Diameter multimedia application. The client is one of the communicating Diameter peers that usually initiates transactions. Examples of communication elements that may implement the Diameter multimedia client are the I-CSCF and S-CSCF. An example of a Diameter multimedia server is the HSS.

Attribute-value pair (AVP) is a generic pair of values that consists of an attribute header and the corresponding value. The AVP can be used, for example, to encapsulate protocol-specific data such as routing information, as well as authentication, authorisation, or accounting information. Diameter messages can contain AVPs to transmit information between an CSCF and the HSS.

Push-Profile-Request message (PPR) is a Diameter command message that a Diameter multimedia server can transmit to a Diameter multimedia client to update subscription data of a multimedia user in the Diameter multimedia client when a modification has occurred in the subscription data the client can use. Push-Profile-Answer message (PPA) is a Diameter command message that a client can transmit in response to a previously received Push-Profile-Request message.

User-Authorization-Request message (UAR) is a Diameter command message that a Diameter multimedia client can send to a Diameter multimedia server to request the authorisation of the registration of a multimedia user. User-Authorization-Answer message (UAA) is a Diameter command message that a server can send as a response to a previously received User-Authorization-Request message. The UAA can include a service profile of the user.

Cx interface exist between both the HSS and the I-CSCF, and the HSS and the S-CSCF. The Cx interface can support transferring following information:
  transfer of CSCF-UE security parameters from HSS to CSCFs. The security parameters allow the CSCFs and the UE to communicate in a trusted and secure way.
  transfer of service parameters of the subscriber from HSS to CSCFs. This may include e.g. service parameters, Application Server (AS) address, triggers, information on subscribed media etc. The information on subscribed media is provided in the form of a profile identifier; details of the allowed media parameters associated with the profile identifier are configured in the S-CSCF.
  transfer of CSCF capability information from HSS to CSCFs. This may include e.g. supported service set, protocol version numbers etc.
  transfer of session signalling transport parameters from CSCFs to HSS. The HSS stores the signalling transport parameters and they are used for routing mobile terminated sessions to the Serving-CSCF. The parameters may include e.g. IP-address and port number of CSCFs, transport protocol etc. The information mentioned above shall be transferred before the CSCF is able to serve the user. It shall also be possible to update this information while the CSCF is serving the user, for example if new services are activated for the user.

In an IMS registration with a CSCF, user equipment (UE) registers itself to a CSCF for a specific time, and the CSCF becomes the UE's serving CSCF (S-CSCF). The time for which the UE is registered in the CSCF is called registration lifetime. Re-registration is a procedure where the UE refreshes its registration to the network before the registration expires.

P-asserted-identity header is a SIP header which can be used among trusted SIP entities to carry the identity of the user sending a SIP message as it was verified in authentication.

An IMS public user identity (IMPU) is a user identity that is used by any user for requesting communications with other users. The IMPU can take the form of a SIP uniform resource identifier (URI) or an E.164 number. Every IMS subsystem subscriber has one or more public user identities. At least one public user identity can be stored in the IM services identity module (ISIM). UE can receive more public identities from the IMS, where they can be stored in the HSS.

An IMPU stored in the HSS can contain an associated display name. The display name is intended to be a more human representation of subscriber's name, in addition to SIP URI or TEL-URI, which are having a fixed format and which cannot be changed easily. The display name can be changed according to subscriber's wishes and the updated display name can replace the previous display name in the HSS. The display name can be changed by the user over various provisioning interfaces. Some examples of provisioning interfaces are graphical user interface (GUI), batch interface, extensible markup language (XML) and service provisioning markup language (SPML). The new display name can be overwritten at the HSS under the user profile information. The methods to change the display name at the HSS can be:

Either via the UE requesting for change of display name
Via the provisioning interface GUI by entering credentials of the user.
Request for the change at a later date from the customer service portal.

A display name of a user can be transmitted from a HSS to an S-CSCF together with a user profile of the user, for example, over Cx reference point in a UAA diameter response or, after update of the display name, in a PPR Diameter command.

FIG. 1 shows architecture relevant for the invention. UE 3 can be a SIP capable multimedia terminal communicating with an IMS network 1, 2, 6 and called parties 7 using SIP. A user of the UE 3 can have various identities used to identify the user in the network. Some of the identities can be permanent, for example, an IMS private user identity (IMPI) or international mobile subscriber identity (IMSI) and some can change over time. A display name is an identity which the user 3 can define and change themselves, for example, over a user management interface 8 which can be, for example, a web portal connected to service provider's subscriber data management system 5. The subscriber data management system 5 can configure the display name is a HSS 4 which is responsible for holding subscription related data of the user 3. During a registration procedure of the user 3, the subscription related data, including the display name, can be transmitted from the HSS 4 to an S-CSCF 1 which in turn can transmit at least part of the subscription related data to a P-CSCF 2. Other network elements which are not shown in FIG. 1, such as an I-CSCF, can be located between the S-CSCF 1 and the P-CSCF 2. When the user of the UE 3 initiates a session towards the UE 7, a SIP request transmitted to the P-CSCF 2 which can add the display name of the user 3 in the SIP request, for example, in a P-Asserted-Identity header. The SIP request is transmitted to the S-CSCF 3 responsible for serving the user 3 which can route and transmit the SIP request towards the called UE 7 via the IMS 6, which can consist of further CSCFs, for example, located in the home network of the UE 7.

During initial registration or re-registration procedure of a user, a display name of the user which an S-CSCF receives from the HSS can be transmitted to a P-CSCF. The P-CSCF can include the display name of the user in new initial request originating the user, for example, in a P-Asserted-Identity header in a SIP INVITE request. If the display name is changed in the HSS, the new display name is transmitted to the S-CSCF immediately but the P-CSCF is not made aware of the new display name. The P-CSCF receives the new display name only when the next re-registration takes place. Meanwhile the P-CSCF CSCF can include an outdated display name in the P-Asserted-Identity header in a SIP INVITE.

According to an aspect of the invention, an S-CSCF can handle the inconsistency between old and new display names stored in the S-CSCF and the P-CSCF.

Figure 2:
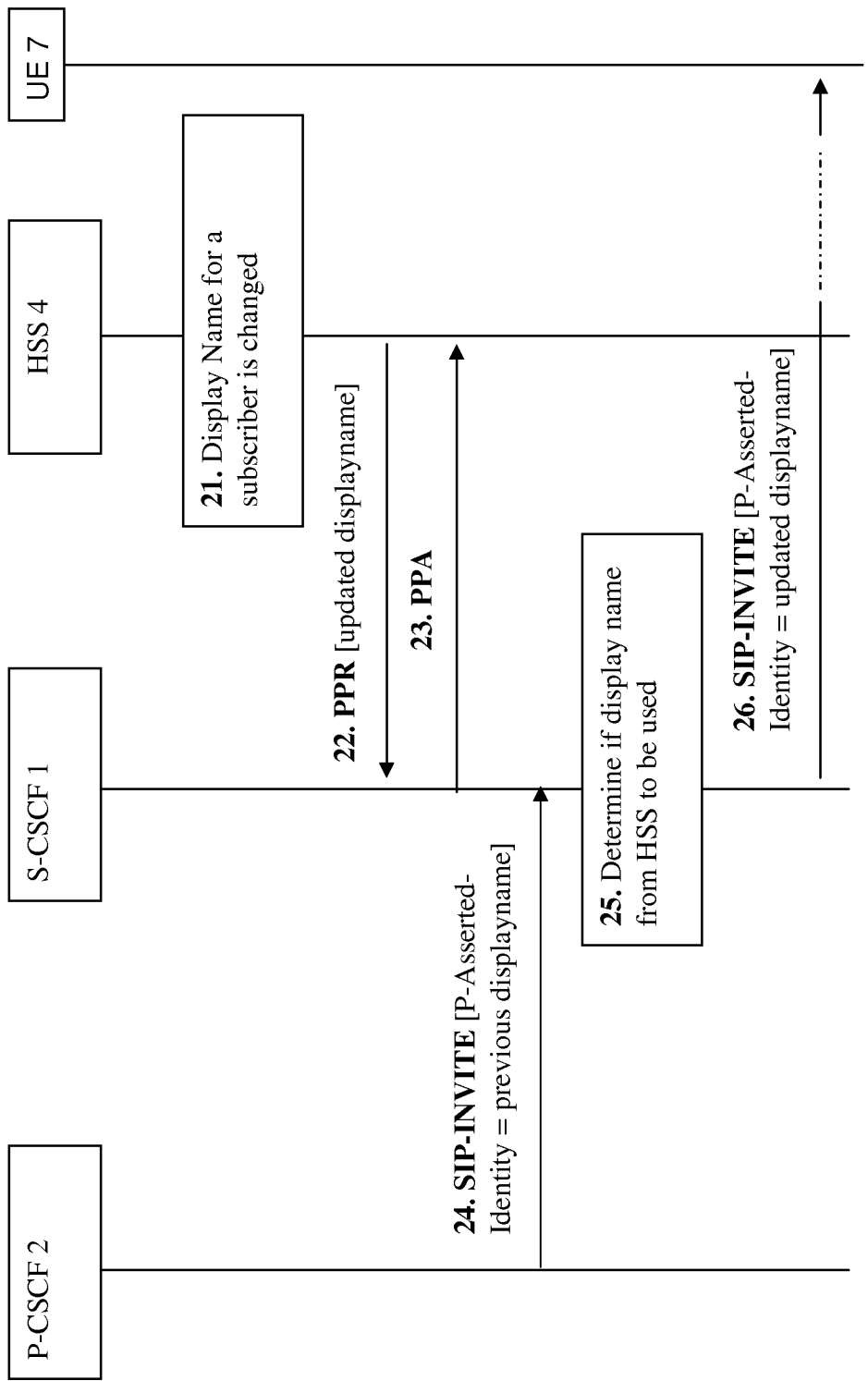
FIGS. 2 and 3 illustrate example signaling flows according to aspects of the invention.

According to an aspect of the invention shown in FIG. 2, a user 3 can change its display name and the new display name is stored 21 in a HSS 4. An S-CSCF 1 can obtain the new display name from the HSS 4 when the S-CSCF 1 requests a user profile of the user 3, or, the updated display name can be pushed 22 to the S-CSCF 1 by the HSS 4 after the change of display name. The S-CSCF 1 can acknowledge 23 the received PPR 22 message with a PPA 23 message. The S-CSCF 1 can perform a check when a request 24, for example, a SIP INVITE, is received. The S-CSCF 1 can detect a display name in the received request. The display name can be included in a P-Asserted-Identity header carried in the SIP INVITE request 24. The S-CSCF 1 can determine 25 if instead of the display name received in the request 24 the new display name obtained from a HSS 4 and which the S-CSCF 1 can have stored in a local memory is to be used, when the S-CSCF 1 transmits the SIP request 26 towards a called party 7.

According to an aspect of the invention, if there is a mismatch between the display name received in the request 24 and the display name obtained 22 from the HSS 4, the S-CSCF 1 can replace the display name from the received request 24 with the display name obtained 22 from the HSS 4. The mismatch can mean that the P-CSCF 2 is holding an old (outdated) display name and therefore the S-CSCF 1 can replace it with the newer (actual) display name which has not been transmitted to the P-CSCF 2 yet. The newer (actual) display name can be used when the request is forwarded towards the called party.

The newer (actual) display name can later be transmitted to the P-CSCF 2 upon re-registration procedure of the user 3, after which the P-CSCF 2 can indicate the updated display name in new requests.

According to an aspect of the invention, the S-CSCF 1 can always include the display name obtained from the HSS 4 in requests to be forwarded towards the called party 7, in other words, without checking if the same display name was already included in the received request 24, and/or, without checking if the received request included a parameter carrying a display name, for example, a P-Asserted-Identity header.

Usually the correct display name is already included in the request 24. Therefore, according to an aspect of the invention, the S-CSCF 1 can first determine if the display name obtained from the HSS 4 shall be included in the request to be forwarded towards the called party 7. The determination can be performed, for example, by maintaining an indication which can indicate if the display name of the user has been changed after previous registration procedure of the user 3. For example, when the S-CSCF 1 receives outside a registration procedure a new display name for the user 3 from the HSS 4, the S-CSCF 1 can set the indication to value "true" which can indicate that including the new display name in requests associated with the user 3 can be necessary. When the next registration procedure is performed, for example, the user 3 is re-registering to the network after expiry of re-registration timer (registration lifetime), the S-CSCF 1 can transmit the new display name to a P-CSCF 2 and can set the indication to value "false" which can indicate that including the new display name in requests associated with the user is no longer necessary because the P-CSCF 2 has the correct display name. Therefore, when the indication is set to value "false", it can be assumed that requests associated with the user 3 already include the correct (new) display name of the user 3.

According to an aspect of the invention, the S-CSCF 1 can include the display name obtained from the HSS 4 in a request only when the received request includes a parameter carrying a display name, for example, a P-Asserted-Identity header. According to an aspect of the invention, if a received request does not contain a display name at all, the S-CSCF 1 takes no action to include a display name in the request to be forwarded towards the called party 7.

Figure 3:
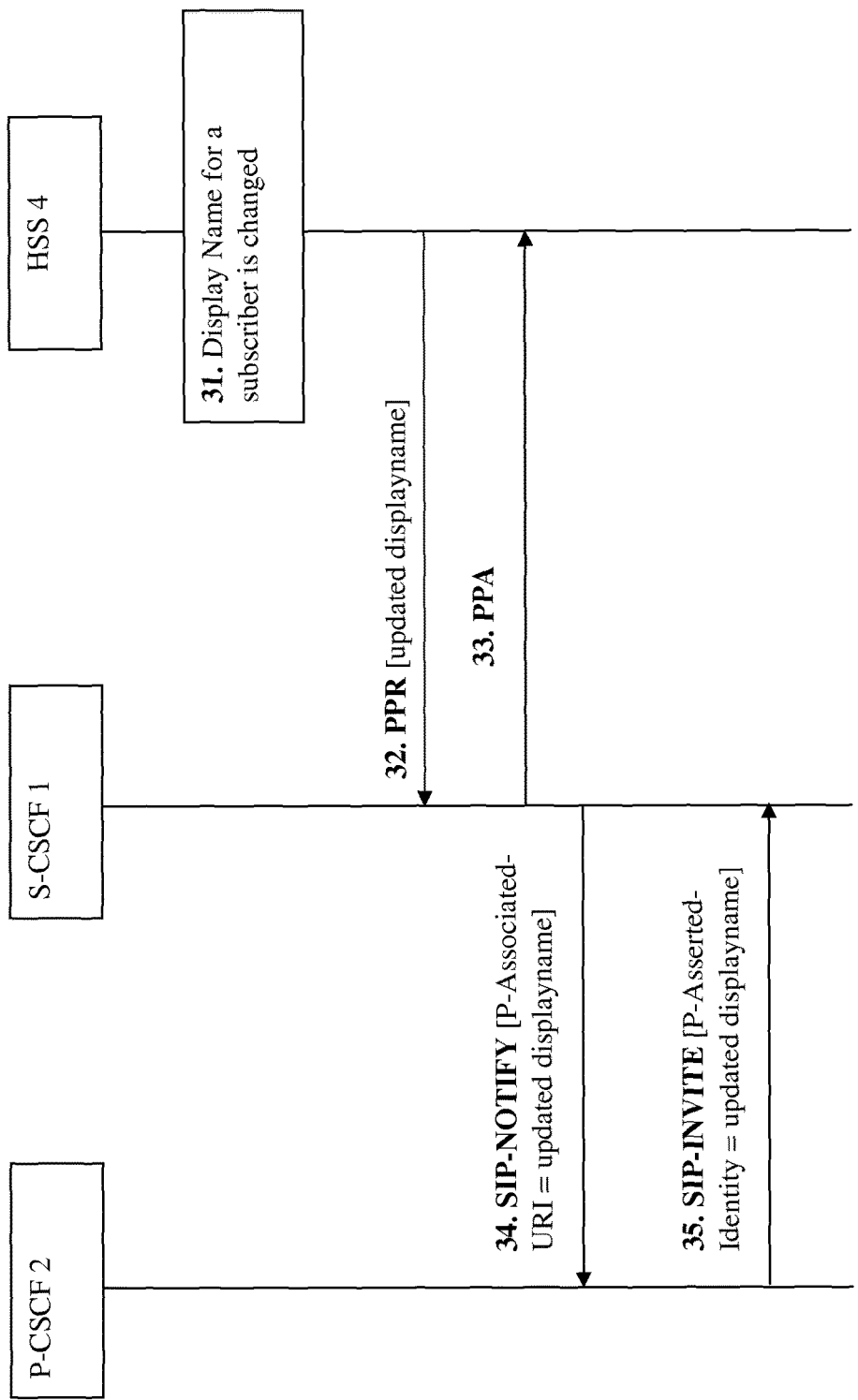

As an alternative and or in addition to what has been described above, according to an aspect of the invention shown in FIG. 3, when a display name is updated 31 in a HSS 4, the same is propagated 34 to a P-CSCF 2 to ensure that the data at the S-CSCF 1, the P-CSCF 2 and the HSS 4 are consistent without having to trigger a network initiated re-registration procedure. According to an aspect of the invention, when an S-CSCF 1 obtains 32 the new display name for the user 3 from the HSS 4, the S-CSCF 1 can transmit 34 the display name to a P-CSCF 2, for example, in a SIP NOTIFY message. The S-CSCF 1 can acknowledge 33 the received PPR 32 message with a PPA 33 message.

A header or parameter in a SIP NOTIFY can be specified for transmitting 34 the updated display name from an S-CSCF 1 to a P-CSCF 2. The SIP NOTIFY can identify the user 3 to which the new display name is transmitted. The P-CSCF 2 can replace the stored display name for the user 3 with the updated display name received 34 in the SIP NOTIFY.

According to an aspect of the invention, functions described above relating to an S-CSCF can be implemented by an application server (AS), such SIP AS, which can interface and receive a display name from a HSS over Sh reference point.

According to an aspect of the invention, it can be assured that the updated display name in the HSS 4 and the display name displayed at the terminating UE 7 for new sessions can be the same.

Figure 5:
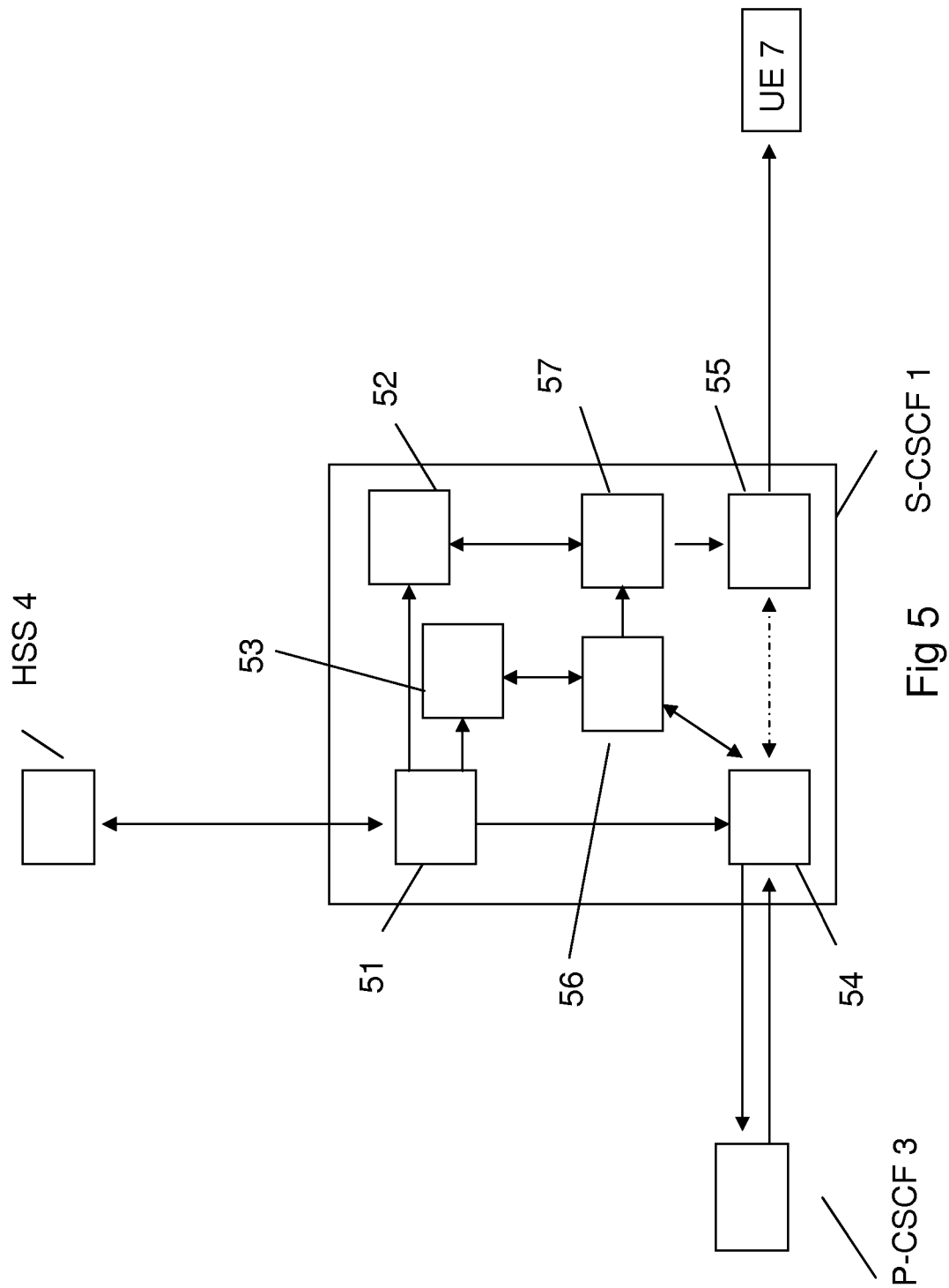
FIG. 5 illustrates example of internal structure and functions of apparatus implementing aspects of the invention.

FIG. 5 illustrates an internal structure and functions of an apparatus implementing aspects of the invention. And apparatus, such as, a session control entity (S-CSCF 1) can contain a receiving unit 51 configured to receive user related information from a HSS 4, for example according to Diameter protocol. The receiving unit 51 can receive information on request, for example, as a response to request for a user profile of the user, or, without request, for example, when the HSS 4 actively pushes updated user related information, such as a display name. A received display name can be stored in a storing unit 52 (memory) and/or an indication can be set in an indication unit 53, for example, if the display name is received without transmitting the display name to a proxy entity, which can happen, for example, if the display name is received outside registration procedure of the user.

A first signaling unit 54 can be configured to receive and transmit signaling messages, for example SIP messages, to/from an origination user (calling party), possible via intermediate network elements (P-CSCF 3, I-CSCF). The first signaling unit 54 can be configured to receive a SIP request (INVITE, MESSAGE) containing a display name of the calling user, for example, in a P-Asserted Identity header.

A second signaling unit 55 can be configured to receive and transmit signaling messages, for example SIP messages, to/from an terminating user (called party), possible via intermediate network elements (P-CSCF 3, I-CSCF). The second signaling unit 54 can be configured to transmit a SIP request (INVITE, MESSAGE) containing a display name of the calling user, for example, in a P-Asserted Identity header.

A determining unit 56 can be configured to determine if a display name of a user received by the first signaling unit 54 is to be replaced by an updated display name of the user, for example, with an updated display name received by the receiving unit 51 and/or stored in the storing unit 52. The determining unit 56 can be configured to check the indication in the indication unit 53 to determine if an updated display name exists for the user, which has not been transmitted to the proxy entity 3. Lack of transmittal can have caused the proxy entity 3 to use an outdated display name of the user and thereby replacing the received display name can be necessary to display the correct display name to the called user. An including unit 57 can be configured to retrieve an updated display name of the user from the storing unit 52 and including it in the SIP request to be forwarded by the second signaling unit 55 towards the called party. The including unit 57 can perform the including the display name from the storing unit 52, for example, for every request to be transmitted or only when the replacing the display name in determined to be necessary by the determining unit 56, and/or, when the received request contained a display name.

According to one aspect of the invention, the first signaling unit 54 can be configured to transmit (e.g. in SIP NOTIFY) a new display name of a user to a P-CSCF 4, when the new display name is received from the HSS 4 by the receiving unit 51, for example, also when the new display name is received outside registration procedure of the user.

All units described above in relation to FIG. 5 may be implemented for example using microprocessors, chips and/or other electrical components and/or by software.

A session control entity may be physically implemented in a switch, router, server or other hardware platform or electronic equipment which can support data transmission and processing tasks, or can be implemented as a component of other existing device.

Figure 4:
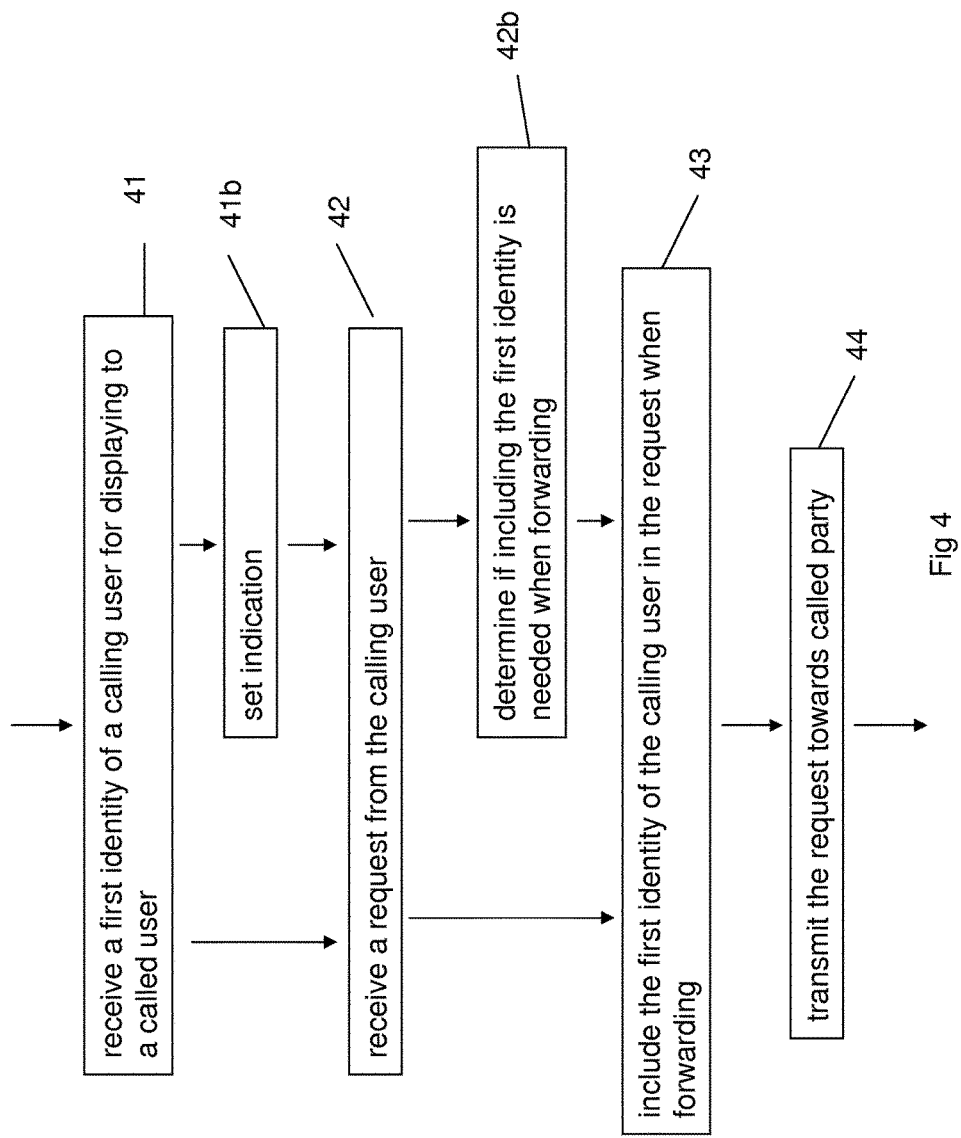
FIG. 4 illustrates an example process for implementing aspects of the invention.

FIG. 4 illustrates an example process for implementing aspects of the invention. In 41, a display name for a user can be received, for example, from a HSS. In an optional step 41b, an indication can be stored which can indicate that a new display name has been received, for example, when the display name in 41 is received outside registration procedure of the user. In 42 a request (SIP INVITE) can be received from the user, possible via P-CSCF, I-CSCF and/or other network elements. In 43, the received display name can be included in the request when the request is transmitted towards a called party. In an optional step 42b which can be performed before the including step 43, a determination can be made if including the received display name in the request is necessary. The including can be considered necessary if it is detected that the display name received in step 41 can be different than a display name in the received request in 42. For example, the indication stored in 41b can be checked to detect the need to replace the display name in the request to be transmitted.

For the purpose of the present invention as described herein above, it should be noted that an access technology via which signaling is transferred to and from a network element or node may be any technology by means of which a node can access an access network (e.g. via a base station or generally an access node). Any present or future technology, such as WLAN (Wireless Local Access Network), WiMAX (Worldwide Interoperability for Microwave Access), BlueTooth, Infrared, and the like may be used; although the above technologies are mostly wireless access technologies, e.g. in different radio spectra, access technology in the sense of the present invention implies also wirebound technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable access networks may be any device, apparatus, unit or means by which a station, entity or other user equipment may connect to and/or utilize services offered by the access network; such services include, among others, data and/or (audio-) visual communication, data download etc.;

a user equipment may be any device, apparatus, unit or means by which a system user or subscriber may experience services from an access network, such as a mobile phone, personal digital assistant PDA, or computer;

method steps likely to be implemented as software code portions and being run using a processor at a network element or terminal (as examples of devices, apparatuses and/or modules thereof, or as examples of entities including apparatuses and/or modules thereof), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

The invention is not limited to transmitting identity in the IMS network(s), but may also be applied in other type of networks having similar kind of identity which a user can change themselves. Functions of the session control entity described above may be implemented by code means, as software, and loaded into memory of a computer.

The invention claimed is:

1. A session control entity, comprising: at least one memory comprising computer program code;
at least one processor;
wherein the at least one memory and the computer program code are configured, with the at least one processor, to cause an apparatus at least to:
receive a first identity of a calling user from a subscription entity, wherein the first identity comprises an identity for displaying to a called user;
receive a separate request from the calling user via a proxy entity without the first identity, wherein the separate request is not received via the subscription entity;
determine whether or not the first identity is to be added to the separate request; add the first identity of the calling user to the request for displaying the first identity of the calling user to the called user;
transmit the request including the first identity towards the called user; and inform the proxy entity of the first identity of the calling user after the request including the first identity of the calling user has been transmitted to the called user.

2. The session control entity of claim 1, wherein the at least one memory and the computer program code are configured, with the at least one processor, to cause the apparatus at least to:
receive a session initiating protocol request.

3. The session control entity of claim 1, wherein the at least one memory and the computer program code are configured, with the at least one processor, to cause the apparatus at least to:
receive a second identity for displaying to a called user.

4. The session control entity of claim 3, wherein the at least one memory and the computer program code are configured, with the at least one processor, to cause the apparatus at least to:
receive the second identity in a P-Asserted-Identity header.

5. The session control entity of claim 3, wherein the at least one memory and the computer program code are configured, with the at least one processor, to cause the apparatus at least to:
compare the first identity with the second identity; and
add the first identity to the request if the second identity differs from the first identity.

6. The session control entity of claim 1, wherein the at least one memory and the computer program code are configured, with the at least one processor, to cause the apparatus at least to:
maintain an indication associated with the first identity; and
indicate it the first identity has been changed after previous registration procedure of the calling user.

7. The session control entity of claim 6, wherein the at least one memory and the computer program code are configured, with the at east one processor, to cause the apparatus at least to:
check the indication indicating if the first identity has been changed; and
include the first identity if the first identity has been changed.

8. The session control entity of claim 6, wherein the at least one memory and the computer program code are configured, with the at least one processor, to cause the apparatus at least to:
transmit the first identity to the proxy entity during registration procedure of the calling user and changing a state of the indication indicating if the first identity has been changed in response to the transmitting the first identity to the proxy entity.

9. The session control entity of claim 6, wherein the at least one memory and the computer program code are configured, with the at least one processor, to cause the apparatus at least to:
change a state of the indication indicating if the first identity has been changed in response to receiving the first identity of the calling user from the subscription entity.

10. The session control entity of claim 1, wherein the identity for displaying to the called user comprises a display name.

11. The session control entity of claim 1, wherein the identity for displaying to the called user is configurable by the calling user.

12. The session control entity of claim 1, wherein the at least one memory and the computer program code are configured, with the at least one processor, to cause the apparatus at least to:
store the first identity of the calling user.

13. A session control entity, comprising:
at least one memory comprising computer program code;
at least one processor;
wherein the at least one memory and the computer program code are configured, with the at least one processor, to cause an apparatus at least to:
receive a first identity of a calling user from a subscription entity outside registration procedure of the calling user, wherein the first identity comprises an identity for displaying to a called user;
determine whether or not the first identity of the calling user-received outside the registration procedure to the calling user, is to be added to a separate request received from the calling user via a proxy entity during the registration procedure, wherein the separate request does not include the first identity;
transmit the request comprising the first identity of the calling user to the called user; and
transmit the first identity of the calling user to the proxy entity after the request has been transmitted to the called user.

14. The session control entity of claim 13, wherein the at least one memory and the computer program code are configured, with the at least one processor, to cause the apparatus at least to:
transmit the first identity in a session initiation protocol NOTIFY message.

15. A method of transmitting an identity for displaying to a called user, comprising:
receiving a first identity of a calling user from a subscription entity, wherein the first identity comprises an identity for displaying to a called user;
receiving a separate request from the calling user via a proxy entity without the first identity, wherein the separate request is not received via the subscription entity:
determining whether or not the first identity is to be added to the separate request;
adding the first identity of the calling user to the request for displaying the first identity of the calling user to the called user;
transmitting the request including the first identity towards the called user; and informing the proxy entity of the first identity of the calling user after the request including the first identity of the calling user has been transmitted to the called user.

16. The method of claim 15, wherein the determining comprises comparing the first identity with a second identity received in the request and wherein the including comprises including the first identity if the second identity differs from the first identity.

17. The method of claim 15, further comprising maintaining an indication associated with the first identity, wherein the indication indicates if the first identity has been chanced after previous registration procedure of the calling user.

18. The method of claim 15, wherein the determining comprises checking an indication indicating if the first identity has been changed and wherein the including comprises including the first identity if the first identity has been changed.

19. The method of claim 15, further comprising transmitting the first identity to the proxy entity during registration procedure of the calling user and changing a state of an indication indicating if the first identity has been changed in response to the transmitting the first identity to the proxy entity.

20. The method of claim 15, further comprising changing a state of an indication indicating if the first identity has been changed in response to receiving the first identity of the calling user from the subscription entity.

21. The method of claim 15, wherein the identity for displaying to the called user comprises a display name.

22. The method of claim 15, wherein the identity for displaying to the called user is configurable by the calling user.

23. The method of claim 15, further comprising storing the first identity of the calling user.

24. A method of transmitting an identity for displaying to a called user, comprising
receiving a first identity of a calling user from a subscription entity outside registration procedure of the calling user, wherein the first identity comprises the identity for displaying to a called user;

determining whether or not the first identity of the calling user, received outside the registration procedure to the calling user, is to be added to a separate request received from the calling user via a proxy entity during the registration procedure, wherein the separate request does not include the first identity;

transmitting the request comprising the first identity if the calling user to the called user;

transmitting the first identity of the calling user to the proxy entity alter the request has been transmitted to the called user.

25. The method of claim 24, wherein the transmitting comprises transmitting the first identity in a session initiation protocol NOTIFY message.

26. A computer program product embodied in a non-transitory computer-readable medium and encoding instructions comprising code means adapted to produce steps of claim 15 when loaded into the memory of a computer.

* * * * *